United States Patent [19]

Chiolle et al.

[11] Patent Number: 5,252,665
[45] Date of Patent: Oct. 12, 1993

[54] POLYESTER BASED SHOCK RESISTANT COMPOSITIONS AND PROCESS FOR THEIR PREPARATION

[75] Inventors: Antonio Chiolle, Ferrara; Gaetano Andreoli, Rovigo, both of Italy

[73] Assignee: Ausimont S.p.A., Italy

[21] Appl. No.: 815,915

[22] Filed: Jan. 2, 1992

Related U.S. Application Data

[63] Continuation of Ser. No. 563,854, Aug. 7, 1990, abandoned, which is a continuation of Ser. No. 378,481, Jul. 11, 1989, abandoned, which is a continuation of Ser. No. 55,078, May 28, 1987, abandoned.

[30] Foreign Application Priority Data

May 29, 1986 [IT] Italy .................. 20606 A/86

[51] Int. Cl.$^5$ ............................ C08L 67/02
[52] U.S. Cl. ........................ 525/64; 525/92; 525/173
[58] Field of Search .............. 525/64, 92, 173

[56] References Cited

U.S. PATENT DOCUMENTS

| | | | |
|---|---|---|---|
| 3,904,706 | 9/1975 | Hoeschelle | 525/440 |
| 3,919,353 | 11/1975 | Castelnuovo et al. | 525/64 |
| 4,011,285 | 3/1977 | Seymour et al. | 525/444 |
| 4,096,202 | 6/1978 | Farnham | 523/201 |
| 4,180,494 | 12/1979 | Fromuth | 525/63 |
| 4,200,567 | 4/1980 | Goldman | 525/64 |
| 4,212,791 | 7/1980 | Avery | 525/67 |
| 4,277,391 | 7/1981 | Charles | 525/64 |
| 4,393,153 | 7/1983 | Hepp | 523/201 |

FOREIGN PATENT DOCUMENTS 0142336 5/1985 European Pat. Off.
0150454 8/1985 European Pat. Off.

OTHER PUBLICATIONS

Patent Abstract of Japan, vol. 5, No. 178, Nov. 14, 1981, (Mitsubishi) Aug. 13, 1981.
Patent Abstract of Japan, vol. 10, No. 199, Jul. 11, 1986, Appln. No. 59-164062 (Mitsubishi Rayon) Mar. 1, 1986.
Rohm and Haas Brochure, Paraloid Modifiers for PVC.

*Primary Examiner*—Patricia A. Short
*Attorney, Agent, or Firm*—Morgan & Finnegan

[57] ABSTRACT

Polyester-based shock-resistant compositions, endowed with a high shock resistance, particularly at low temperatures comprising:
(a) a matrix constituted by one or more saturated polyesters;
(b) an elastomer constituted by butadiene or acrylic rubbers; and
(c) a block-copolyester.

9 Claims, No Drawings

POLYESTER BASED SHOCK RESISTANT COMPOSITIONS AND PROCESS FOR THEIR PREPARATION

This is a continuation of co-pending application Ser. No. 07/563,854, filed on Aug. 7, 1990, now abandoned, which is a continuation of Ser. No. 07/378,481, filed Jul. 11, 1989, now abandoned, which is a continuation of Ser. No. 07/055,078, filed May 28, 1987, now abandoned.

DESCRIPTION OF THE INVENTION

1. Field of the Invention

The present invention relates to shock-resistant compositions based on polyesters, and to a process for their preparation.

More particularly, the present invention relates to polyester-based polymeric compositions endowed with a high shock resistance, particularly at low temperatures.

2. Background of the Invention

In U.S. Pat. No. 3,919,353 compositions based on saturated polyesters have been disclosed and claimed, the shock resistance of which was enhanced by dispersing into them an elastomeric phase constituted by butadiene rubbers, such as, e.g., polybutadiene or butadiene/styrene copolymers, or by polyolefinic rubbers, such as, e.g., saturated or unsaturated ethylene/propylene copolymers, which have been previously cross-linked and modified by a grafting reaction with polar monomers. In the grafted and cross-linked elastomer, the cross-linked phase is present in an amount of at least 30%, and, preferably, at least 50%.

The shock resistance of such compositions, at room temperature, is considerably improved as compared to that of polyesters without such an elastomeric phase; however, their low-temperature shock resistance, in particular within the range of from 0° C. to −40° C., is not completely satisfactory for some applications.

New shock-resistant, polyester-based compositions have been now discovered, in accordance with the present invention, which maintain high characteristics of shock resistance also at low temperatures.

DETAILED DESCRIPTION OF THE INVENTION

The compositions of the present invention are characterized in that they comprise:
(a) from 55 to 98% by weight of one or more saturated polyesters;
(b) from 1 to 35% by weight of butadiene and/or acrylic rubber; and
(c) from 1 to 10% by weight of an elastomeric copolyester.

The compositions of the present invention may be obtained by dispersing and/or blending the above mentioned (a), (b) and (c) components in the molten state, or as solutions in suitable solvents which are subsequently removed by per se conventional techniques.

The preferred process consists in operating at such temperatures as to have the (a) and (c) components in the molten state, blending them with each other, and then dispersing into them the (b) component in the form of small-size particles, preferably with an average diameter within the range of from 0.1 to 2 microns, by using well-known equipment for preparation of polymeric blends, such as mixers, extruders, and so forth.

During the preparations of these compositions, several additives, such as stabilizers, antioxidants, pigments, dyes, flame-proofing agents, lubricants, organic and inorganic reinforcing agents (carbon fibers or fiberglass, aramidic fibers, talc, asbestos, etc.), nucleating agents, and so on, may be added.

The saturated polyesters (a) used in the compositions of the present invention are thermoplastic resins having an intrinsic viscosity of at least 0.4 dl/g (as measured on a 1:1 phenol/tetrachloroethane mixture), obtained from an aromatic or cycloaliphatic dicarboxylic acid, with a diol having the formula:

$$HO-R-OH \qquad (I)$$

wherein R is a linear branched alkylene radical containing from 2 to 20 carbon atoms, or an arylene or cycloalkylene radical containing from 6 to 20 carbon atoms.

Examples of preferred dicarboxylic acids are terephthalic acid, isophthalic acid and cyclohexane-1,4-dicarboxylic acid; examples of preferred diols are ethanediol, propanediol, butanediol, and hexanediol.

Some examples of preferred saturated polyesters are poly(ethyleneterephthalate), poly(propyleneterephthalate), poly(butyleneterephthalate), and poly(hexamethylene-cyclo-hexane-1,4-dicarboxylate), and their blends.

These polyesters may be produced according to per se known techniques for polycondensation or polytransesterification The saturated polyesters used in the preparation of the compositions of the present invention may possibly contain, however in amounts smaller than 15% by mol in respect of the aromatic or cyclo-aliphatic acids, aliphatic dicarboxylic acids of from 4 to 20 carbon atoms. As examples of aliphatic dicarboxylic acids which may be used, adipic acid and sebacic acid may be mentioned.

The (b) component used in the compositions of the present invention may be a butadiene rubber, or an acrylic rubber.

By the term "butadiene rubber", any elastomeric polymer is meant which is obtained either by direct polymerization, or by polymerization and a subsequent grafting reaction of butadiene and/or isoprene with ethylenically unsaturated monomers, such as, e.g., styrene, acrylonitrile, methacrylonitrile, acrylic and methacrylic esters, acrylic and methacrylic acid, maleic acid and anhydride, maleic and fumaric esters, alkylstyrenes, in any combinations with one another. Typical examples of butadiene rubbers are the butadiene/styrene/acrylonitrile or butadiene/styrene/methylmethacrylate terpolymers, as well as the same terpolymers, or polybutadiene, or natural rubber, or butadiene/styrene or butadiene/acrylonitrile copolymers subsequently modified by a grafting reaction with a polar monomer, such as acrylonitrile, styrene, acrylic or methacrylic esters, methacrylic acid, maleic acid and anhydride, and so forth.

By the term "acrylic rubbers", any elastomeric polymer is meant which is obtained, either by direct polymerization or by polymerization and subsequent grafting reaction of alkyl-esters of acrylic or methacrylic acid, containing from 1 to 10 carbon atoms in their alkyl chain, such as, e.g., ethyl acrylate, butyl acrylate, methyl methacrylate and cyclohexyl methacrylate. Together with these monomers, for the synthesis of the above-said acrylic rubbers, other ethylenically unsaturated monomers may also be used, such as, e.g., styrene, alkylstyrenes, acrylonitrile, methacrylonitrile, and/or, in an amount of from 0.1 to 5% by weight, such di- or poly-functional monomers (cross-linking agents) as ethyleneglycol acrylate or methacrylate, glycidyl methacrylate, allyl methacrylate, diallylmaleate, diallylphthalate, hydroxyethyl methacrylate, etc. Typical examples of acrylic rubbers are the polymers obtained from alkylesters of acrylic or methacrylic acid, such as butyl acrylate, ethyl acrylate and methyl methacrylate, possibly containing minor amounts, e.g., from 10 to 30% by weight, of styrene or acrylonitrile, and small amounts, e.g., from 0.5 to 3% by weight, of ethyleneglycol methacrylate or allyl methacrylate.

Said (b) rubbers are characterized by a main glass transition temperature ($T_g$) lower than 0° C., and by a cross-linking degree (gel content) within the range of from 0 to 99% by weight, and preferably from 50 to 99% by weight.

The cross-linking may be already present in the rubber before this is blended with the other components, or it may be achieved during said blending, with the possible further addition of monomers of the above-indicated types and in the presence of free-radical initiators, or with the addition of suitable other cross-linking agents, such as, e.g., diisocyanates, diamines, diols, and so on.

The (c) component used in the compositions of the present invention is a block-copolyester having a melting point lower than 190° C., obtained by means of the polycondensation or transesterification of an aropmatic dicarboxylic acid with a diol having the above formula (I), and with a polyetherglycol having the formula:

$$HO-(R_1-O)_m-H \qquad (II)$$

wherein $R_1$ is a linear or branched alkylene radical containing from 2 to 20 carbon atoms, and m is an integer higher than 2, and such that the molecular weight of the polyetherglycol is within the range of from 300 to 10,000, and preferably from 600 to 4,000.

Examples of suitable polyetherglycols are polyoxytetramethyleneglycol, polyoxyethyleneglycol, polyoxypropyleneglycol, etc., or mixtures thereof.

Said block-copolyesters have a content of rigid segments—by which term is meant segments which are derived from the esterification of the acid with the diol having formula (I)—within the range of from 10 to 75% by weight. Furthermore, the ratio of the number of carbon atoms to the number of oxygen atoms present in the polyetherglycol (II) preferably is equal to, or higher than 2.

The lower the content of rigid segments in the compositions of the present invention, the greater is the improvement of the resilience thereof caused by the presence of copolyesters (c). More particularly, a content of rigid segments in the copolyesters, within the range of from 30 to 50% by weight, allows a favorable compromise to be made between stiffness and shock-resistance and shape stability on heating.

To the compositions of the present invention other thermoplastic materials may be added, such as, e.g., any per se known type of polycarbonate, in particular that obtained from bisphenol A and phosgene; any known type of thermoplastic polyurethane, and in particular that obtained from methylene-bis(phenylisocyanate), and polyether-glycols and/or polyester-glycols. Furthermore, poly(vinyl chloride), polyamides, polystyrenes, ABS resins, etc., may be added.

The amount of said thermoplastic materials may vary over a wide range. In particular, amounts of thermoplastic materials lower than 25%, and preferably within the range of from 1 to 10% by weight, relative to the total composition, are recommended.

The compositions of the present invention are mainly characterized by a good low-temperature shock-resistance; more particularly, at temperatures of from 0° C. to −40° C.; they are furthermore endowed with very good resistance to gasolines, to oils, to light, and to thermo-oxidation. Thanks to these peculiar characteristics, the compositions of the present invention are particularly suitable for use in certain fields, such as, e.g., in car and motorcycle field (bumpers, fenders, spoilers, side-body moldings, protective helmets, etc.), and in the sports field (ski-boots, soles for ice skates, etc.), wherein the above-mentioned characteristics have a considerable importance.

EXAMPLES

For the purpose of illustrating the present invention still more extensively and in still greater detail, some examples are now supplied, which are in no way to be regarded as being limitative thereof.

EXAMPLES 1-4

By means of a twin-screen extruder MARIS TM 33, at a temperature of 260° C., and with a screw revolution speed of 150 rpm, blends are prepared which are constituted by:
(a) polybutyleneterephthalate having a viscosity of 1.4 dl/g;
(b) grafted butadiene/styrene/methylmethacrylate terpolymer with a cross-linking degree (gel content) of 94% by weight, and a glass transition temperature ($T_g$) = −80° C., manufactured by Rohm and Haas under the tradename KM 653 containing from 58-62% by weight polybutadiene, from 12-18% by weight styrene and from 24-26% by weight methylmethacrylate; and
(c) copolyesters obtained from terephthalic acid, 1,4-butanediol and polyoxytetramethyleneglycol, with a molecular weight of about 1000, and having different contents of rigid segments, as reported in Table 1 below.

During the preparation of said blends, antioxidants, i.e., 0.4% of IRGANOX 1010 and 04% of IRGAFOS 168, are also added.

The weight ratios of the blend components are reported in Table 1.

Rods from the extruder are pelletized and dried from 2 to 4 hours 80°-140° C. The material is subsequently injection-molded at 260° C. to obtain suitable specimens for property determinations, according to ASTM Standards.

Such properties are reported below in Table 1:

TABLE 1

|  | Example No. | | | |
| --- | --- | --- | --- | --- |
|  | 1 | 2 | 3 | 4 |
| Composition | | | | |
| (a) Polybutyleneterephthalate | 74.2 | 74.2 | 74.2 | 74.2 |

TABLE 1-continued

|  | | | Example No. | | | |
| --- | --- | --- | --- | --- | --- | --- |
|  | | | 1 | 2 | 3 | 4 |
| (b) Rubber KM 653 | | | 25 | 20 | 20 | 20 |
| (c) Copolyester containing: | | | | | | |
| 33% of rigid segments | | | | 5 | | |
| 46% of rigid segments | | | | | 5 | |
| 66% of rigid segments | | | | | | 5 |
| (d) Antioxidants | | | 0.8 | 0.8 | 0.8 | 0.8 |
| Properties | Method | Unit | | | | |
| Specific Gravity at 23° C. | D.720 | g/cm$^3$ | 1.21 | 1.21 | 1.25 | 1.25 |
| Yield Strength | D.638 | MPa | 35 | 36 | 35 | 35 |
| VICAT | D.1525 | °C. | 123 | 126 | 130 | 133 |
| Flexural Modulus | | | | | | |
| at 23° C. | D.790 | MPa | 1450 | 1440 | 1430 | 1550 |
| at 80° C. | D.790 | MPa | 250 | 250 | 260 | 280 |
| IZOD | | | | | | |
| at +23° C. | D.256 | J/m | 820 PR | 925 PR | 910 PR | 890 PR |
| at −15° C. | D.256 | J/m | 190 | 650 PR | 820 | 260 |
| at −40° C. | D.256 | J/m | 100 | 450 | 250 | 150 |
| Distortion Temperature (HDT) | | | | | | |
| under 4.5 kg | D.648 | °C. | 80 | 81 | 85 | 97 |
| under 18.2 kg | D.648 | °C. | 45 | 47 | 47 | 48 |

PR = Partially cracked.

EXAMPLES 5-7

By operating under the same conditions as in Examples 1-4, granules are prepared from blends consisting of:

(a) polybutyleneterephthalate having a viscosity of 1.4 dl/g;

(b) polybutylacrylate grafted with methylmethacrylate, having a gel content of 91% by weight, and a glass transition temperature ($T_g$) of −50° C., manufactured by Rohm and Haas under the tradename KM 323 B; and (c) copolyesters obtained from terephthalic acid, 1,4-butanediol and polyoxytetramethyleneglycol, with a molecular weight of about 1000, and having different contents of rigid segments, as reported in Table 2 below.

During the preparation of these blends, 0.8% by weight of antioxidants, as already specified in the foregoing examples, were also added.

The weight ratios between the blend components and the properties as determined on the specimens obtained from said blends, are reported below in Table 2.

TABLE 2

|  | | | Example No. | | |
| --- | --- | --- | --- | --- | --- |
| Composition | | | 5 | 6 | 7 |
| (a) Polybutyleneterephthalate | | | 74.2 | 74.2 | 74.2 |
| (b) Rubber KM 323 B | | | 25 | 20 | 20 |
| (c) Copolyester containing: | | | | | |
| 33% of rigid segments | | | | 5 | |
| 46% of rigid segments | | | | | 5 |
| (d) Antioxidants | | | 0.8 | 0.8 | 0.8 |
| Specific Gravity at 23° C. | D.720 | g/cm$^3$ | 1.22 | 1.21 | 1.22 |
| Yield Strength | D.638 | MPa | 38 | 35 | 37 |
| VICAT | D.1525 | °C. | 120 | 110 | 120 |
| Flexural Modulus | | | | | |
| at 23° C. | D.790 | MPa | 1650 | 1550 | 1620 |
| at 80° C. | D.790 | MPa | 360 | 320 | 340 |
| IZOD | | | | | |
| at +23° C. | D.256 | J/m | 600 PR | 820 PR | 650 PR |
| at −15° C. | D.256 | J/m | 200 | 650 PR | 450 PR |
| at −40° C. | D.256 | J/m | 100 | 160 | 140 |
| Distortion Temperature (HDT) | | | | | |
| under 4.5 kg | D.648 | °C. | 85 | 75 | 84 |
| under 18.2 kg | D.648 | °C. | 48 | 45 | 46 |

PR = Partially cracked.

EXAMPLES 8-11

Examples 1-4 are repeated, with polybutyleneterephthalate being replaced by a mixture of polybutyleneterephthalate/polyethyleneterephthalate in 40:60 weight ratio.

The compositions of the blends, and the properties of the specimens obtained from said blends are reported in the following Table 3:

(c) copolyester obtained from terephthalic acid, 1,4-butanediol, and polyoxytetramethyleneglycol, having a molecular weight of about 1000, and having a content of rigid segments of 33%; and (d) polycarbonate obtained from phosgene and bisphenol A, manufactured by ENICHEM under the tradename SINVET 271, or thermoplastic polyurethane marketed by UPJOHN under the tradename ISOPLAST 201.

The compositions of the blends and the properties of the specimens obtained from said blends are reported in the following Table 4.

TABLE 3

| | | | Example No. | | | |
|---|---|---|---|---|---|---|
| | | | 8 | 9 | 10 | 11 |
| Composition | | | | | | |
| (a) 40:60 Polybutylene-terephthalate/polyethylene-terephthalate blend | | | 74.2 | 74.2 | 74.2 | 74.2 |
| (b) Rubber KM 653 | | | 25 | 20 | 20 | 20 |
| (c) Copolyester containing: | | | | | | |
| 33% of rigid segments | | | | 5 | | |
| 46% of rigid segments | | | | | 5 | |
| 66% of rigid segments | | | | | | 5 |
| (d) Antioxidants | | | 0.8 | 0.8 | 0.8 | 0.8 |
| Properties | Method | Unit | | | | |
| Specific Gravity at 23° C. | D.720 | g/cm³ | 1.23 | 1.225 | 1.225 | 1.227 |
| Yield Strength | D.638 | MPa | 40 | 38 | 37 | 39 |
| VICAT | D.1525 | °C. | 120 | 125 | 127 | 130 |
| Flexural Modulus | | | | | | |
| at 23° C. | D.790 | MPa | 1550 | 1480 | 1570 | 1590 |
| at 80° C. | D.790 | MPa | 300 | 260 | 290 | 290 |
| IZOD | | | | | | |
| at +23° C. | D.256 | J/m | 700 | 900 | 800 | 850 |
| at −15° C. | D.256 | J/m | 170 | 750 | 600 | 550 |
| at −40° C. | D.256 | J/m | 80 | 600 | 450 | 320 |
| Distortion Temperature (HDT) | | | | | | |
| under 4.5 kg | D.648 | °C. | 80 | 77 | 79 | 78 |
| under 18.2 kg | D.648 | °C. | 54 | 49 | 50 | 52 |

EXAMPLES 12–15

By operating under the same conditions as in Examples 1–4, blends are prepared which consist of:
(a) polybutyleneterephthalate having a viscosity of 1.4 dl/g;
(b) butadiene rubber of the KM 653 type, manufactured by Rohm and Haas;

TABLE 4

| | | | Example No. | | | |
|---|---|---|---|---|---|---|
| | | | 12 | 13 | 14 | 15 |
| Composition | | | | | | |
| (a) Polybutyleneterephthalate | | | 67.2 | 67.2 | 67.2 | 67.2 |
| (b) Rubber KM 653 | | | 25 | 20 | 25 | 20 |
| (c) Copolyester | | | | 5 | | 5 |
| (d) Polycarbonate SINVET 271 | | | 7 | 7 | | |
| Polyurethane ISOPLAST 201 | | | | | 7 | 7 |
| (d) Antioxidants | | | 0.8 | 0.8 | 0.8 | 0.8 |
| Properties | Method | Unit | | | | |
| Specific Gravity at 23° C. | D.720 | g/cm³ | 1.198 | 1.208 | 1.200 | 1.203 |
| Yield Strength | D.638 | MPa | 42 | 34 | 42 | 32 |
| VICAT | D.1525 | °C. | 120 | 135 | 125 | 132 |
| Flexural Modulus | | | | | | |
| at 23° C. | D.790 | MPa | 1350 | 1500 | 1420 | 1380 |
| at 80° C. | D.790 | MPa | 220 | 250 | 240 | 230 |
| IZOD | | | | | | |
| at +23° C. | D.256 | J/m | 980 PR | 1050 PR | 200 | 850 PR |
| at −15° C. | D.256 | J/m | 900 | 1030 PR | 180 | 880 PR |
| at −40° C. | D.256 | J/m | 300 | 900 PR | 80 | 350 PR |
| Distortion Temperature (HDT) | | | | | | |
| under 4.5 kg | D.648 | °C. | 88 | 75 | 78 | 70 |

TABLE 4-continued

|  |  |  | Example No. | | | |
| --- | --- | --- | --- | --- | --- | --- |
|  |  |  | 12 | 13 | 14 | 15 |
| under 18.2 kg | D.648 | °C. | 49 | 46 | 52 | 50 |

PR = Partially cracked.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A shock resistant polymeric composition comprising:
   (a) from 55 to 98% by weight of polybutyleneterephthalate having an intrinsic viscosity of at least 0.4 dl/g;
   (b) from 1 to 35% by weight of butadiene/styrene/methyl methacrylate terpolymer rubber containing 58 from to 62% by weight polybutadiene, from 12 to 18% by weight styrene and from 24 to 26% by weight methylmethacrylate and having a cross-linking degree (gel content) of 94-99% by weight with a Tg less than 0° C.; and
   (c) from 1 to 10% by weight of a block-copolyester having a melting point lower than 150° C., and obtained by polycondensation or transesterification of an aromatic dicarboxylic acid with a diol having the formula (I)

$$HO-R-OH \quad (I)$$

wherein R is a linear or branched alkylene radical containing from 2 to 20 carbon atoms, or an arylene or cycloalkylene radical containing from 6 to 20 carbon atoms, and with a polyetherglycol having the formula:

$$HO-(R_1-O)_m-H \quad (II)$$

wherein $R_1$ is a linear or branched alkylene radical containing from 2 to 20 carbon atoms, and m is an integer greater than 2, and such that the molecular weight of the polyetherglycol is within the range of from 300 to 10,000.

2. A polymeric composition according to claim 1, wherein the terpolymer rubber is in the form of particles having a size within the range of from 0.1 to 2 microns.

3. A polymeric composition according to claim 1, wherein the molecular weight of the polyetherglycol is within the range of from 600 to 4,000.

4. A polymeric composition according to claim 1, wherein the block-copolyester has a content of rigid segments within the range of from 10 to 75% by weight, and the ratio of the number of carbon atoms to the number of oxygen atoms in the flexible segments is equal to or greater than 2.

5. A polymeric composition according to claim 1, wherein the block-copolyester has a content of rigid segments within the range of from 30 to 50% by weight, and the ratio of the number of carbon atoms to the number of oxygen atoms in the flexible segments is equal to or greater than 2.

6. A polymeric composition according to claim 1 or 2, wherein also containing at least one additive selected from the class consisting of stabilizers, antioxidants, pigments, dyes, flame-proofing agents, lubricants, organic and inorganic reinforcing agents, and nucleating agents.

7. The composition according to claim 1, wherein the intrinsic viscosity of the poly(butylene terephthalate) is 1.4 dl/g.

8. The composition of claim 1 wherein the cross-linking degree (gel content) is 94% by weight.

9. The composition of claim 1, wherein the $T_g$ is equal to −80° C.

* * * * *